(12) United States Patent
Haake et al.

(10) Patent No.: US 10,340,095 B2
(45) Date of Patent: Jul. 2, 2019

(54) SAFETY-SWITCH DEVICE FOR USE ON A MOVABLE DEVICE

(71) Applicants: André Haake, Stadtlohn (DE); Oliver Haake, Stadtlohn (DE); Patrick Haake, Vreden (DE)

(72) Inventors: André Haake, Stadtlohn (DE); Oliver Haake, Stadtlohn (DE); Patrick Haake, Vreden (DE)

( * ) Notice: Subject to any disclaimer, the term of this patent is extended or adjusted under 35 U.S.C. 154(b) by 0 days.

(21) Appl. No.: 15/247,958

(22) Filed: Aug. 26, 2016

(65) Prior Publication Data

US 2016/0365200 A1    Dec. 15, 2016

Related U.S. Application Data

(63) Continuation of application No. PCT/EP2015/053951, filed on Feb. 25, 2015.

(30) Foreign Application Priority Data

Feb. 27, 2014   (DE) .................... 20 2014 001 722 U

(51) Int. Cl.
| | |
|---|---|
| *H01H 3/02* | (2006.01) |
| *B66F 9/24* | (2006.01) |
| *B66F 17/00* | (2006.01) |
| *B60T 7/22* | (2006.01) |
| *H01H 9/02* | (2006.01) |

(52) U.S. Cl.
CPC .............. *H01H 3/022* (2013.01); *B60T 7/22* (2013.01); *B66F 9/24* (2013.01); *B66F 17/003* (2013.01); *H01H 9/02* (2013.01); *B60T 2201/022* (2013.01)

(58) Field of Classification Search
CPC .............. H01H 3/022; B60T 7/22; B66F 9/24
USPC ................................................ 200/61.44, 329
See application file for complete search history.

(56) References Cited

U.S. PATENT DOCUMENTS

| | | | | |
|---|---|---|---|---|
| 5,167,432 | A | * | 12/1992 | Buttner ...................... F16P 3/12 |
| | | | | 200/61.44 |
| 5,237,302 | A | * | 8/1993 | Harris ..................... H01H 3/001 |
| | | | | 307/113 |
| 5,319,996 | A | * | 6/1994 | Harris ....................... G05G 1/30 |
| | | | | 200/330 |

(Continued)

FOREIGN PATENT DOCUMENTS

| | | |
|---|---|---|
| DE | 3824637 A1 | 1/1990 |
| EP | 0298714 A2 | 1/1989 |
| EP | 0582100 A1 | 2/1994 |

(Continued)

*Primary Examiner* — Edwin A. Leon
*Assistant Examiner* — Iman Malakooti
(74) *Attorney, Agent, or Firm* — Jeffrey Joyce, Esq.

(57) ABSTRACT

A safety-switch device for mounting on a movable device. An impact surface is mounted on or assembled in a bracket. The bracket, impact surface, and a mounting surface of the movable device form a protective enclosure around the switch. The switch is a switch strip or a switch mat. The impact surface is a separate, movable, rigid or stiff component that serves as an actuator for the switch and is provided as a component that is easily replaceable. A trigger mechanism is provided between the impact surface and the switch. When the impact surface moves from its resting position to its actuation position, the trigger mechanism trips the switch.

11 Claims, 3 Drawing Sheets

(56) References Cited

U.S. PATENT DOCUMENTS 5,465,807 A * 11/1995 Josephs .................. A01D 75/20
                                                                          180/274
2007/0227869 A1* 10/2007 Jones ..................... H01H 3/022
                                                                          200/334

FOREIGN PATENT DOCUMENTS

| FR | 2523908 A1 | 9/1983 |
| FR | 2633571 A1 | 1/1990 |

* cited by examiner

SAFETY-SWITCH DEVICE FOR USE ON A MOVABLE DEVICE

BACKGROUND INFORMATION

Field of the Invention

The invention relates to a safety-switch device for use on movable devices.

Discussion of Prior Art

It is known in the industry to provide a conventional safety-switch device on movable devices as a means of accident prevention. Such movable devices can, for example, be parts of larger apparatus and examples of such movable devices include freely movable articulated arms, booms, etc. The movable devices may, however, also include vehicles, such as a forklift truck. Hereinafter, reference is made to an electric motor powered forklift truck as the movable device, but it is understood that this reference is only by way of example and that it includes other types of movable devices.

It is known to provide a forklift truck with a conventional safety-switch device, whereby the switch is a switch, i.e., a flexible, deformable, strip or tube-like element, that is placed on the housing of the forklift truck. The purpose of this conventional safety-switch device is to prevent accidents and provide personal safety. With operating a forklift truck, for example, the type of accident that typically occurs is that the operator, when maneuvering the forklift truck in a tight space and, particularly, moving the truck in reverse, guides the vehicle too close to himself, so that the vehicle runs over the operator's foot. The conventional safety-switch devices are therefore placed outside on the housing of the forklift truck. This enables the fastest possible contact and, thus, the fastest possible actuation of the safety switch, which, when triggered, immediately switches off the power drive of the forklift truck. In applications on movable devices other than forklift trucks, it is possible, instead of switching the motor off, that the switch of in the safety-switch device changes or reverses the direction of travel of the device, or sets off an alarm signal.

The goal of the safety-switch device is to ensure the fastest response, i.e., the fastest triggering of an alarm of the fastest switching off of a motor, and for this reason, the safety-switch devices are placed on the outside on the movable devices in obvious places where a problem is likely to occur. This is an advantage as far as the safety response is concerned, but it does, however, increase the risk that the switch circuit itself will be damaged, for example, when coming into contact with hard objects, such a masonry walls, shelves, pallets, stationary machines, or, staying with the example of a forklift truck, when bumping into another forklift truck. If the safety-switch device is damaged, then it may become ineffective, and no longer serve its function as a safety device for the movable device. If this is the case, then the movable device is either operated in an unsafe condition or, it is taken out of operation to be repaired. In the latter case, the movable device is now unavailable and that presents an economic disadvantage.

U.S. Pat. No. 5,653,568 A1 discloses a conventional safety-switch device that can be used as a safety device on forklift trucks or on hydraulic truck loading ramps. In these circuits, the electrical contacts are placed inside a deformable hollow profile. Contact of an object against the hollow profile causes the profile to deform, i.e., the profile is compressed, so that the contacts touch each other, thereby actuating the desired switch operation. The deformable hollow profile represents in this case an integral component of the switch that bears one of the two electrical contacts. At the same time, it also provides an impact surface that has to be moved by some external pressure. Damage to this hollow profile, however, also means that the switch itself is damaged.

What is needed, therefore, is a safety-switch device that ensures the safest possible operation of a movable device. What is further needed is such a safety-switch device that has an impact surface that can be replaced quickly and without the use of tools. What is yet further needed is such a switch circuit that is easy to manufacture and easy to fit to different types of movable devices, either during production or as a retrofit.

BRIEF SUMMARY OF THE INVENTION

The safety-switch device according to the invention is a safety device that is intended to be mounted on a movable device and includes a switch, an impact surface, and a bracket. Together, the impact surface, the bracket, and a surface of the movable device form a protective enclosure around the switch. The impact surface is a separate element that is mounted or incorporated into the bracket, so as to remain movable between a resting position and an actuation position. If an obstacle makes contact with the bracket and/or impact surface, the force of the contact on the impact surface moves the impact surface from its resting position forward, in the direction of the contact force, toward the switch, thereby actuating the switch. For this reason, the impact surface may also be referred to as a switch actuator.

It is foreseeable, that the impact surface may be damaged as a result of coming into contact with an obstacle. For this reason, the impact surface is constructed as a separate component that can be quickly and easily replaced, should it become damaged. In other words, the underlying concept of the safety-switch device according to the invention is to provide the element of the device that is most likely to be damaged, i.e., the impact surface, as an inexpensive that can easily be swapped out for a replacement impact surface. This quick repair means that the availability of the movable device remains high, even if certain elements of the enclosure of the safety-switch device become damaged and require replacement.

The impact surface in the safety-switch device according to the invention is an element that has sufficient stiffness or rigidity, that an impact at any location on the element is transmitted across the element. It is also mechanically robust, because forces that act on the impact surface at an angle are deflected off. The rigid construction of the impact surface also provides a particularly sensitive trip or trigger mechanism for the switch, because an impact force against the impact surface, even in an area that is not directly aligned with a trigger mechanism provided between the impact surface and the switch is transmitted along the rigid surface and, as a result, the impact surface with the trigger mechanism is moved toward the switch, reliably tripping the switch. For this reason, the switch does not have to be placed such, that it extends across the entire impact surface. Rather, the impact surface may have a first flat area directly in front of switch, and one or more second flat areas, behind which there is no switch. In other words, the impact surface may extend across an area that is greater than the surface area of the switch. If the obstacle makes contact against the impact surface at such a second flat area, then the impact surface, because of its rigid construction, does not deflect under this impact, but rather, the movement on the impact surface that results from the contact with the obstacle is transmitted along the rigid surface, and, hence, transmitted onto the first flat area that is directly in front of the switch. In other words, the switch may actually be some distance offset, i.e., to the side or above or below the point of contact on the impact surface, but the rigid construction ensures that the movement anywhere on the impact surface is transmitted across the impact surface, thereby moving the impact surface toward the switch and ensuring an optimal response behavior of the switch.

The rigid construction of the impact surface also makes it possible to create a desired optical appearance of the impact surface with simple means, even if the impact surface is made of a plastic material. For example, the impact surface may be covered with a colored or metallic film or be painted; wooden or metal elements may be adhesively affixed to it; or a metallic looking so-called chromate conversion coating may be applied to the impact surface. The possibilities listed here are not conclusive, but are merely examples of various possibilities for creating the visual appearance of the impact surface. The fact that the impact surface does not have to be flexibly deformable significantly expands the realm of possibilities of the objects or materials that can be applied to or used to form the impact surface. Also, the materials used to make the impact surface do not have to contain softeners. This is an advantage not only for ecological reasons, but also with regard to the service life of the impact surface. Softeners are volatile substances and evaporate with time. The physical properties of a material that includes such softeners can change over time, possibly degrading the material and reducing the service life of an object made with such material.

The impact surface may be made of a plastic material and this is an advantage, because plastic is inexpensive and easy to deform to a desired shape. But it is not necessary that the impact surface be made of plastic. Rather, other materials may also be suitable for the impact surface, materials that either require no additional surface treatment or that are easy to handle and work with conventional means. For example, the impact surface may be made of sheet metal or some other metallic material.

The impact surface is mounted as part of the enclosure that is movable between a first and a second position. The first position is designated the resting position and it allows the unhindered operation of the movable device that is equipped with the safety-switch device. The second position, by contrast, is designated as the actuation position, because the impact surface in this position trips the switch and accordingly initiates a switch operation. The switch itself may be almost any type of switch, i.e., a tactile, optical, capacitive, or other type of sensor may be used as the switch.

The trigger mechanism to trip the switch is provided between the impact surface and the switch. In one embodiment, the trigger mechanism may be one or more protrusions that are integrally formed on the inner surface of the impact surface, i.e., the surface facing the switch. If the switch is a tactile sensor, for example, this type of trigger mechanism provides a particularly fast way of tripping the switch, because the protrusion(s) make direct contact with the switch. If now an obstacle hits against the outside of the impact surface on a place that is not directly at the first flat section with its trigger mechanism, but rather hits against one of the second flat sections that is some distance offset from the trigger mechanism, the switch operation is still reliably triggered, because of the rigidity of the impact surface, which causes the entire impact surface to move in the direction of the impact, i.e., toward the switch, which brings the trigger mechanism within actuation range of the switch. Assuming the trigger mechanism is a protrusion and the switch a tactile sensor, the movement brings the protrusion into direct contact with the sensor; if the switch is a capacitive sensor, the movement brings the protrusion close enough to the capacitive sensor to trigger it; if the switch is an optical sensor, the movement brings the protrusion into the field of detection of the sensor.

As already mentioned, it is envisioned that the safety-switch device according to the invention is well suited for forklift trucks, be they self-powered forklift trucks or operator-driven forklift trucks. But the safety-switch device is also suitable for use on other movable devices, such as a revolving door. The danger with such doors is that a person or object can get pinched between the moving door and the stationary frame. To avoid this, the safety-switch device according to the invention may be mounted on the vertical edges of either the revolving door panels or the stationary frame, or also on the lower edge of a door panel. Additional applications include, for example, portal systems, for example, portal milling, or machine hoods, or robotic arms, i.e., on various types of movable elements. The use of the safety-switch device according to the invention is described below with reference to a forklift truck, but this is merely an example that is representative of a movable device; it is understood that the safety-switch device according to the invention is suitable for use on other types of movable devices.

Many movable devices are equipped with a manually actuated emergency OFF switch, and, ideally, the safety-switch device is connected to the same contacts that this manually operated emergency OFF switch is connected to. Thus, an automatic triggering of the safety-switch device results in the same switch operation as occurs when emergency OFF switch is intentionally manually actuated. This also avoids having to get inside the drive control of the movable device, in order to connect the safety-switch device. Thus, the safety-switch device according to the invention may be easily incorporated into mass produced movable devices, as well as be easily retrofitted onto already existing movable devices.

The impact surface may be constructed as a type of curtain or apron, which is a particularly economical embodiment of the safety-switch device, because the impact surface may be cut or stamped, for example, from a commercially available flat sheet, such as, for example, a rubber mat, or the sheet material that is used to form the walls of trucks, or other material that has sufficient stiffness that is desired for the impact surface.

In a first embodiment, the bracket that forms part of the enclosure may be a flexibly deformable body against which at least a portion of the area of the impact surface lies. For example, the impact surface may be adhesively affixed to this bracket by means of a relatively weak adhesive, so that, on the one hand, the impact surface remains securely affixed to the bracket during operation of the movable device, but may be easily peeled off, if it becomes damaged and needs to be replaced. Or the impact surface may be reliably affixed to the bracket by means of a latch mechanism that is also releasable, to allow the impact surface to be easily replaced.

A foam material, such as a foamed plastic, is a suitable material for creating a bracket with a flexibly deformable body. Such materials are inexpensive, commercially available, and are easily machined or shaped. So, for example, it is relatively easy to shape the foam to give the bracket a certain outer contour, to form or create a hollow chamber in the foam to enhance the deformability of the bracket or create recesses to receive elements of the safety-switch device, and to mount the switch inside this flexibly deformable foam body.

The switch may be constructed as a switch strip or switch mat. Such switches have proven in the field to be mechanically robust and to function reliably with a sensitive response time when actuated. They are also resistant against environmental influences, such as pollution, contamination, liquids, etc. The construction of the switch as a strip or mat makes it possible to design a relatively flat safety-switch device, so that it does not increase in an inadmissibly negative way the outer contour of the movable device that is equipped with the safety-switch device, as this could otherwise result in an increased risk of damage for the safety-switch device itself.

The bracket may be constructed as a flexible strip that holds the impact surface such, that the impact surface is suspended with its lower end hanging free beyond the bracket. This flexible strip allows the rigid impact surface to move between its resting position and its operational position, in which the bracket is deformed and moves with the impact surface in the direction of the switch. The strip is constructed to be flexible overall, and this also allows the rigid impact surface to move in different directions, so that the impact surface can reliably trigger the switch, even when the external forces acting on the impact surface originate from various directions. Due to its flexible construction, the strip is more robust and better able to withstand impacts and other influences than, for example, a hinged arrangement consisting of rigid elements.

As mentioned above, the impact surface is freely suspended from the bracket and this has a couple of advantages. First, it increases the movability of the impact surface, and this facilitates a sensitive response upon contact with an obstacle. Second, suspending the impact surface in the bracket allows the surface to be replaced quite quickly, if it should become damaged. Being suspended, the impact surface can simply be slid or snapped out from the bracket, rather than having to remove some kind of frame that surrounds it.

The flexible strip that forms the bracket may be constructed as a profile strip made of an elastomeric material. In this way, the bracket is able to adapt to the contours of different movable devices, simply by cutting an appropriate length from a large roll of an extruded profile strip. Making the bracket from an elastomeric profile strip enables an uncomplicated assembly of the bracket, without having to use mechanically sensitive components, such as, for example, a hinge that is constructed of several movable, but rigid, hinge elements. Nevertheless, the desired movability of the impact surface is assured when the impact surface is affixed to the elastomeric profile strip.

Advantageously, the profile strip may be constructed as a hollow profile that has a hollow chamber in cross-section. This construction improves the movability of the profile strip and, thus, also the movability of the impact surface that is held on the profile strip, and this ensures the most sensitive response behavior of the safety-switch device.

The impact surface may advantageously be assembled on the bracket so that it is quickly replaceable, essentially without requiring the use of tools. For example, flexible mushroom-shaped elements may be provided on the bracket and the impact surface be provided with corresponding openings, so that the impact surface is simply buttoned onto the bracket. In a particularly simple and economical, as well as mechanically robust construction, a groove is formed in the bracket for receiving and holding the impact surface.

With this configuration, the impact surface merely has to be pulled out of this groove when it needs to be replaced. The groove provides an essentially tool-free mounting of the impact surface on the bracket, yet also ensures that the impact surface is reliably held on the bracket along its entire length. A few fastening elements may be distributed along the length of the bracket and be used to secure the impact surface in the groove. Such fastening elements include, for example, clips, screws, etc. After loosening such fastening elements as needed, the impact surface can easily be removed from the bracket, namely, be pulled out of the groove and swapped out with a replacement part.

Profiles may be provided on the upper edge of the impact surface and the groove that mate with each other, so that there is a positive form-fit between the impact surface and the groove. When the bracket is constructed as an elastomeric profile, the positive form-fit reliably holds the impact surface in the elastomeric profile, but, because the elastomeric bracket is able to yield, it also allows the impact surface to be removed from the groove without the use of tools. Thus, for example, applying a tensile force sufficient to overcome the fit between the mating profiles on the groove and the impact surface allows the impact surface to be removed from the groove.

Ideally, the lower edge of the impact surface is not simply a straight edge, but rather, is curved on the side that extends toward the movable device. This provides an enlarged trigger surface of the impact surface on its lower edge, namely there, where there is a gap to the ground or floor. Using the forklift truck as an example, this curved lower end reduces the risk of contact with the rigid impact surface causing injury, but it also creates a relatively large contact surface, particularly in the direction of the gap between the impact surface and the floor on which the forklift truck drives. This greater contact surface increases the reliability of the safety-switch device according to the invention by increasing the ability to switch the drive motor of the forklift truck off as fast as possible.

The impact surface is preferably dimensioned to be only large enough to cover the switch. This prevents objects from getting between the movable device and the impact surface outside of the area of the switch, which then—particularly because of the rigid construction of the impact surface— could reduce the movability of the impact surface and hinder a triggering of the switch. Particularly when the switch is constructed as a switch strip or switch mat, having the impact surface dimensioned to cover only the switch improves the functional safety of the safety-switch device, because, any object or contamination that gets between the impact surface and the switch does not degrade the response behavior of the switch, but rather, results in a particularly sensitive response behavior, because the object, similarly to the trigger that is according to the invention placed between the impact plate and the switch, results in a particularly fast actuation of the switch, namely, is able to trigger the switch with just a slight movement of the impact surface.

An advantageous construction of the forklift truck has the safety-switch device according to the invention on the outside of the housing that encloses the drive motor. The drive motor is conventionally controlled by means of an electronic drive control. The safety-switch device according to the invention is functionally connected to this drive control, such that the switch states of the safety-switch device are processed directly in the drive control. As a result, the drive motor is switched off upon contact of an obstacle with the impact plate.

The safety-switch device according to the invention is produced by initially determining the surface geometry of an existing component, i.e., movable device, on which the safety-switch device is to be installed and then shaping the bracket to conform to this shape. The surface geometry of the movable device is best determined by using a scanner to record it. The bracket is then manufactured as a part that is adapted to the surface geometry of the movable device. A suitable process for producing the bracket is a 3-D process, which is computer-controlled and based on the scanned data, to create the shape of the bracket. For example, a computer-controlled milling machine may be used to machine a component with the appropriately shaped surface from a block of material, or a 3-D printer may be used that produces the bracket with the desired contour, layer by layer. As a result, the bracket is precisely adapted to fit against the surface of the corresponding movable device, for example, a robotic arm, the rear end of a forklift truck, etc.

Similarly, the safety-switch device according to the invention may be so manufactured, that the impact surface is adapted to the surface of an existing movable device. In this case, too, the first step is to record the surface geometry of the existing movable device by means of a scanner, then to create the impact surface by means of a 3-D process. But, unlike with the bracket, the impact surface is not formed so that it fits precisely against the surface of the movable device, but that has a shape that corresponds to mounting the impact surface a predetermined distance from the surface of the movable device, i.e., that there is a space between the impact surface and the surface of the component. This distance is, for example, determined by the particular construction of the switch and the bracket. The safety-switch device may be constructed with this method, so that it does not form an obstructive, excessively wide overhang over the existing component, but rather, fits harmoniously with the outer appearance of the component.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
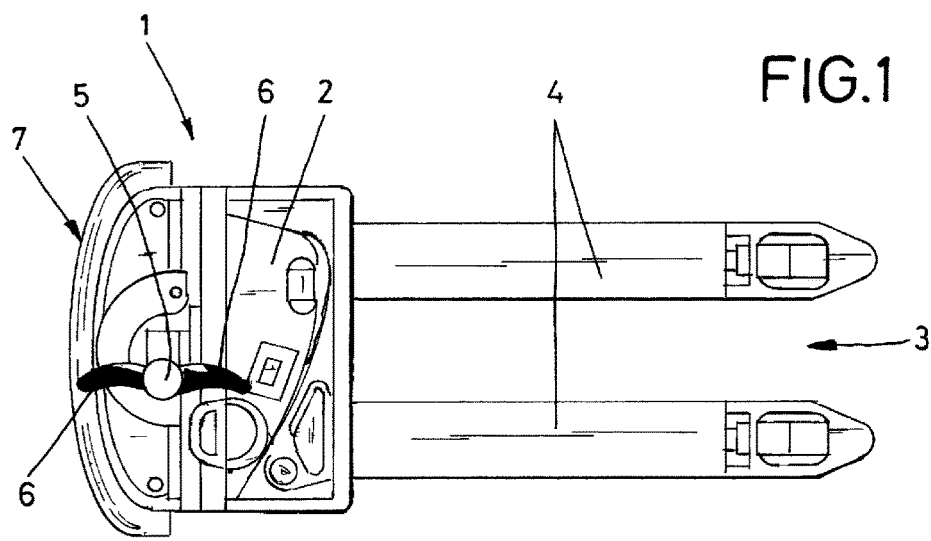
FIG. 1 is a top plan view of a forklift truck that is equipped with a first embodiment of a safety-switch device according to the invention.

FIG. 1 illustrates a movable device 1, which is represented by a forklift truck that has a housing 2 and a fork 3 with two blades or tines 4. An electrical drive motor with an electrical power supply is arranged inside the housing 2. A handle 5 in the form of a drawbar is provided as the control device for the forklift truck 1. The drawbar 5 is shown vertically upright in FIG. 1 and has two hand grips 6, as well as control elements such as keys, switches, etc., that serve to control the drive motor and are connected to an electronic drive control. Typically, an emergency OFF switch is also provided. It is understood that the forklift truck is merely representative of the movable device 1 and that the actual movable device may be another type of device, such as a boom, a robotic arm, a revolving door, etc.

Figure 2:
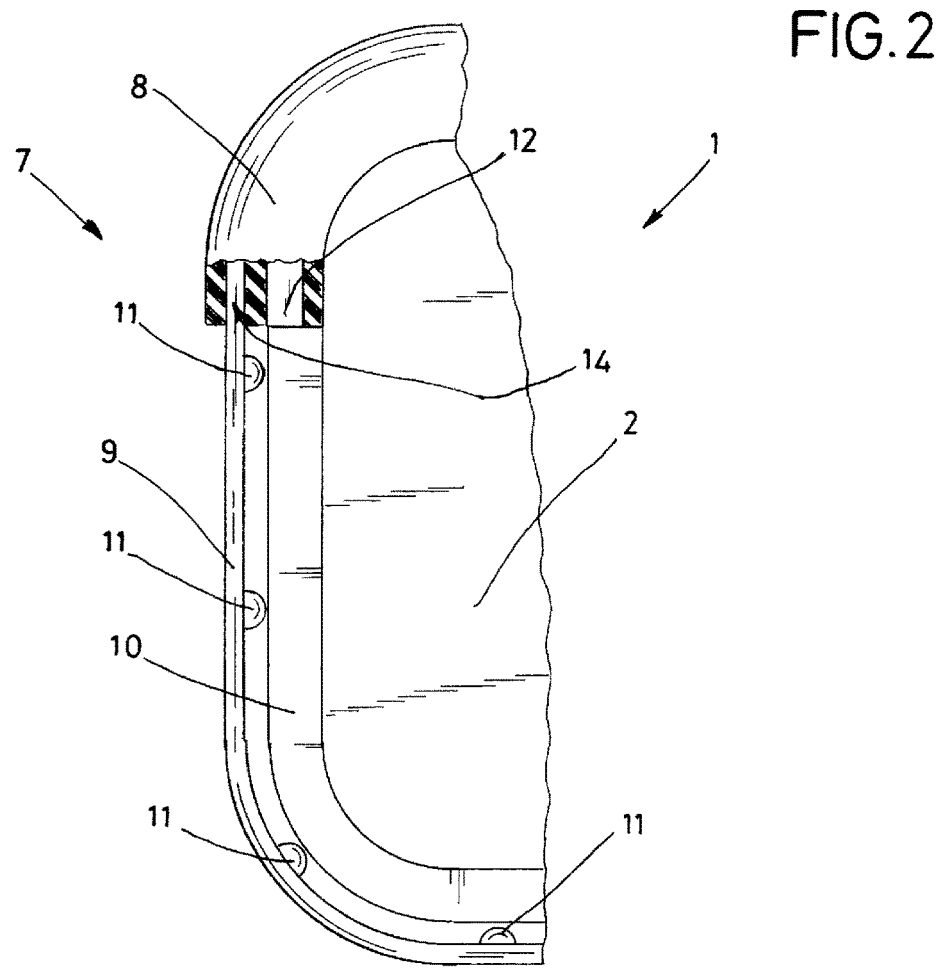
FIG. 2 a partial horizontal cross-section of the safety-switch device of FIG. 1.
Figure 3:
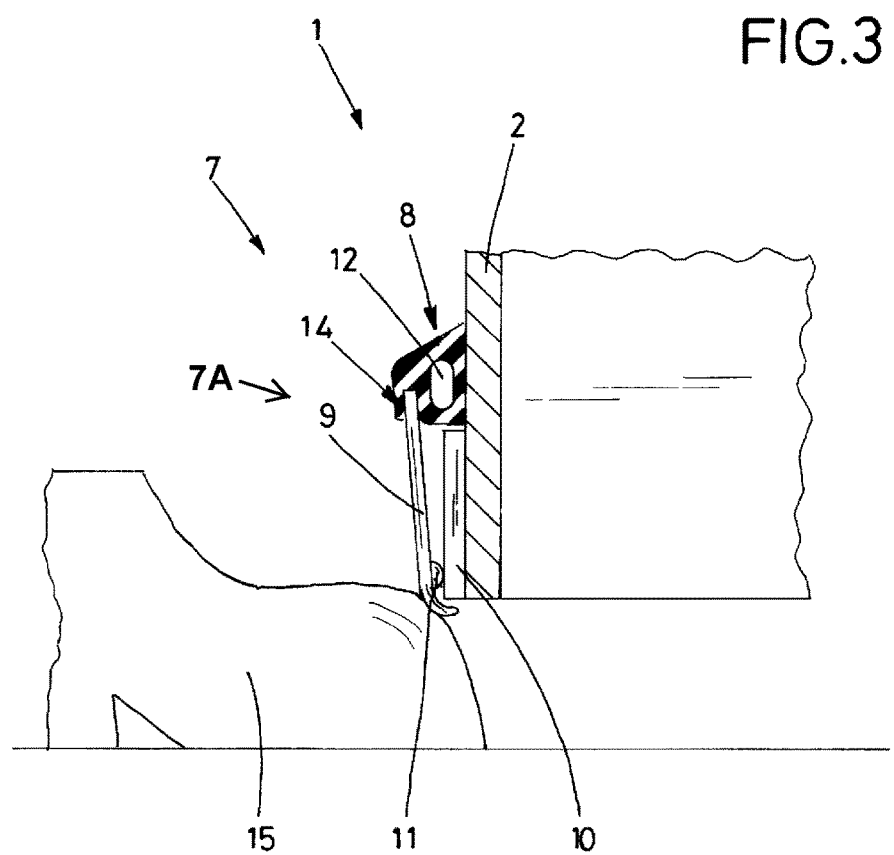
FIG. 3 is a vertical cross-section through the forklift truck, showing the safety-switch device of FIG. 1.

FIGS. 1 to 3 illustrate a first embodiment of a safety-switch device 7 according to the invention that is used with the movable device 1. The safety-switch device 7 is mounted on the outside of the housing 2. In the embodiment shown, the safety-switch device 7, which is shown oversized in FIG. 1, serves as an emergency OFF switch: when actuated or triggered, the safety-switch device 7 immediately switches off the drive motor.

FIGS. 2 and 3 illustrate details of the safety-switch device 7 according to the invention, which comprises an enclosure 7A that surrounds a switch 10. Referring particularly to FIG. 3, the enclosure in this embodiment includes a bracket 8, an impact surface 9, and a surface of the housing 2 on which the bracket 8 is mounted. The impact surface 9 is assembled in the bracket 8 and the bracket 8 is affixed to the housing 2.

The impact surface 9 serves as the actuator for the switch 10, which in the embodiment shown is constructed as a switch mat. A trigger mechanism 11, in this case, a plurality of trigger points 11, are provided on the impact surface 9. These trigger points 11 are protrusions that extend from the inner surface of the impact surface 9 toward the switch 10. The protrusions 11 are shown here as trigger points, but this is purely a schematic rendition and it is understood that other constructions of the protrusions may also be suitable, such as, for example, ridges that are provided as straight or curved lines on the impact surface 9.

Referring still to FIG. 3, the bracket 8 is an elastomeric profile with a hollow chamber 12 and a groove 14. The advantage of providing the bracket 8 as a flexible profile strip is that it can readily be adapted to fit against surfaces of various shapes on movable devices 1, and may then be adhesively affixed to the particular surface and, in the embodiment shown, the bracket 8 is adhesively affixed to the housing 2 of the forklift truck 1. The hollow chamber 12 on this embodiment serves to enhance the deformability of the bracket 8.

The groove 14 is open toward the bottom and is designed to receive an upper edge of the impact surface 9, such that the impact surface 9 is flexibly suspended in the groove 14, with the lower edge of the impact surface 9 hanging freely. The impact surface 9 is a rigid or stiff component, such as, for example, a plate, and has a shape in the horizontal plane that is adapted to the specific geometry of the movable device 1 that the safety-switch device 7 is mounted on. The impact surface 9 may be provided as a single component that is accordingly adapted to the specific geometry of the movable device 1, or may be provided as a plurality of segments, each segment having a straight profile in the horizontal plane, but when assembled together, they form a profile that is a polygonal curve that approximates the desired shape.

The flexible suspension of the impact surface 9 in the bracket 8 not only allows the impact surface 9 to move in the horizontal direction, i.e., to move toward the switch 10, but also allows the impact surface 9 to move upward to some extent and away from the obstacle 15. The impact surface 9 does not move exclusively in the vertical upward direction, but, because of its contact with the obstacle 15, moves diagonally upward, with the lower edge moving toward the housing 2. The trigger points or protrusions 11 are arranged close to the lower edge of the impact surface 9, as seen in FIG. 3, so that the slanted upward movement of the impact surface 9 results in the protrusions 11 closest to the point of contact with the obstacle 15 directly triggering the switch 10.

The upper area of the impact surface 9 and the groove 14 have corresponding horizontally ribbed surfaces that extend parallel to the upper edge of the impact surface 9 and in the longitudinal direction of the groove 14. This ribbing provides a positive form fit between the groove 14 and the upper edge of the impact surface 9 and is a reliable means of holding the impact surface 9 in the bracket 8. The impact surface 9 is assembled in the bracket 8 simply by sliding the upper edge with the ribbing into the groove 14. This also means that the impact surface 9 is easy to replace, should it become damaged, simply by sliding the damaged impact surface 9 and inserting a new one.

FIG. 3 also shows that the lower edge of the impact surface 9 is curved toward the housing 2, and that there is a gap between the vertical surface of the impact surface 9 and the switch 10. The gap is covered toward the bottom by the curved lower end of the impact surface 9, as a means to prevent foreign bodies or contamination from getting up into the gap.

An obstacle 15, which, in accordance with the example of a forklift truck as the movable device 1, is a shoe, i.e., the foot of a person standing close to the forklift truck is schematically depicted in FIG. 3. The lower curved edge of the impact surface 9 acts as a bumper or fender and this prevents the impact surface 9 from becoming hung up or caught in the obstacle 15 when bumping into it.

The installation of the safety-switch device 7 is particularly simple if the switch 10 is connected to the same contacts that the already existing emergency OFF switch on the handle 6 is connected to. Not only does this simplify the installation, but the same switch operation that the emergency OFF switch triggers then also occurs automatically when the safety-switch device 7 is triggered. Connecting the switch 10 to existing contacts is known in the field and is not shown in the figures.

Figure 4:
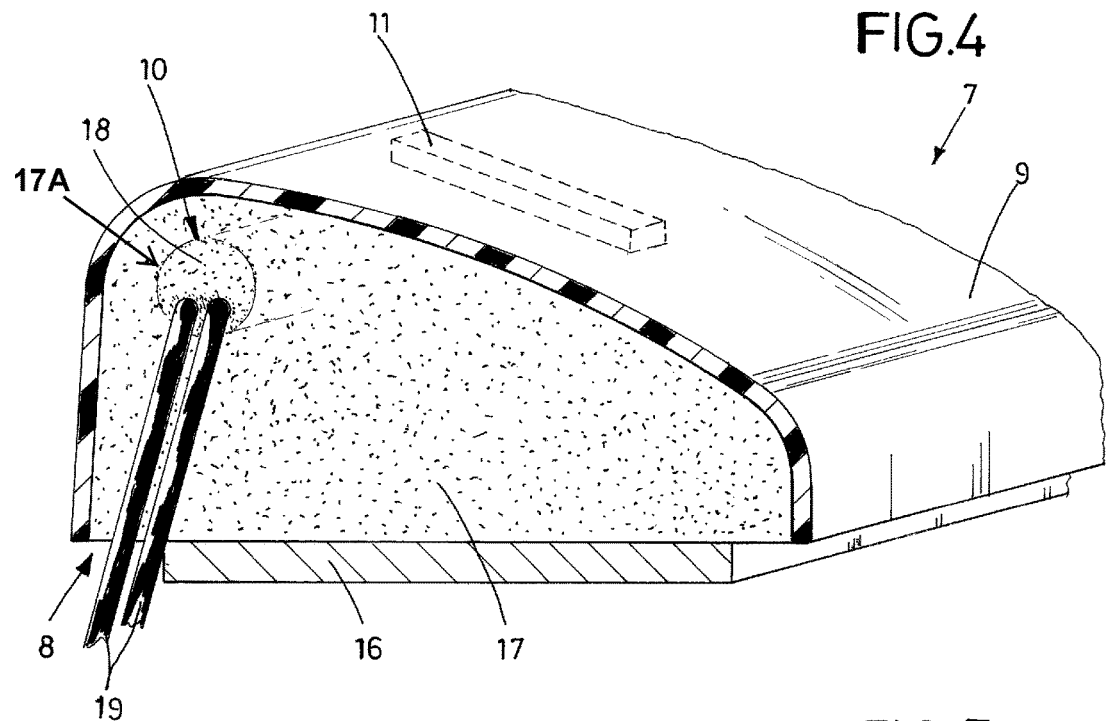
FIG. 4 is a perspective view of a second embodiment of the safety-switch device according to the invention.
Figure 5:
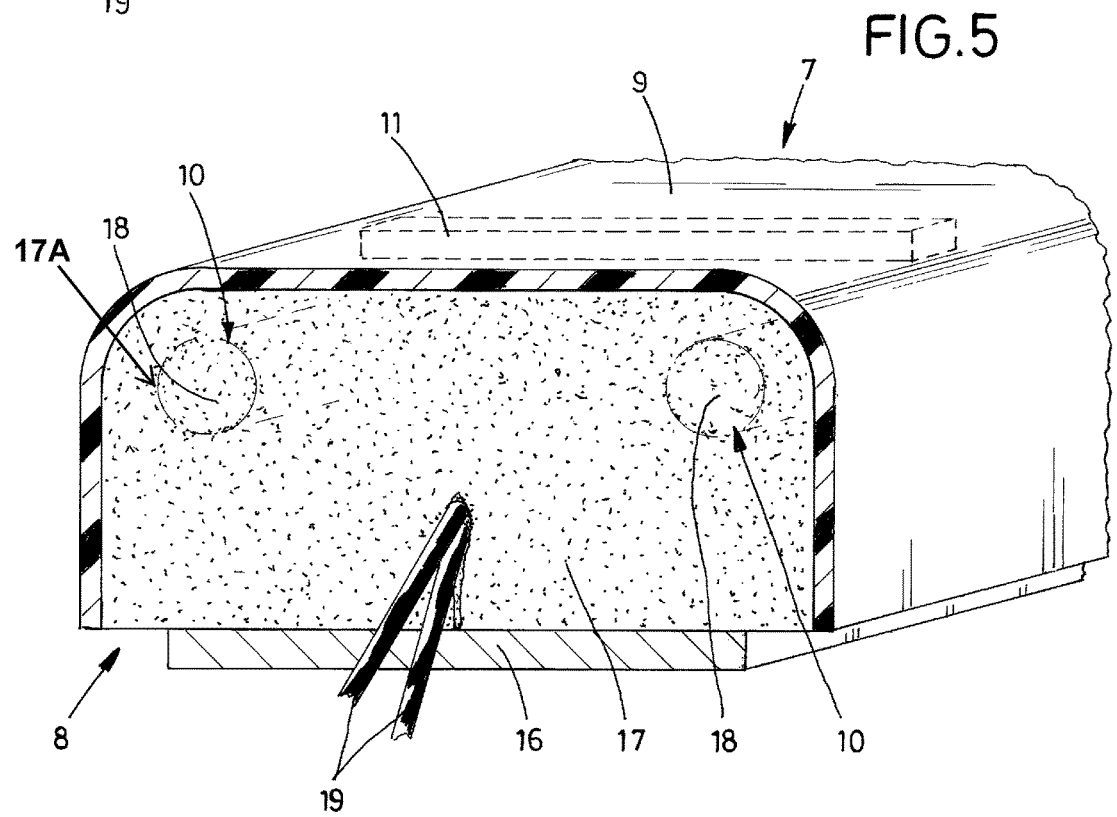
FIG. 5 is a perspective view of a third embodiment of the safety-switch device according to the invention.

FIGS. 4 and 5 illustrate embodiments of the safety-switch device 7 in which the bracket 8 includes an assembly plate 16 and a foam block 17, by means of which the safety-switch device 7 is mounted on the specific movable device 1. In both figures, only a short section of the particular safety-switch device 7 is shown, whereby the complete safety-switch device 7 is significantly longer than the section shown. The assembly plate may be made of a metal or a hard plastic. The two embodiments each show that the assembly plate 16 is a flat component. The side of the assembly plate 16 that faces away from the impact surface 9 may be shaped to correspond to the shape of the surface of the movable device 1, so that the assembly plate 16 fits precisely against the surface. In other words, the assembly plate 16 may be curved in a convex or concave shape, or have a different shaped contour. This shaped contour on the assembly plate 16 may be created using a 3-D process, for example.

The foam block 17 is made of a flexible, elastically deformable plastic foam and is affixed to the assembly plate 16. One or more channels or bores 17A have been created in the foam block 17 and switch strips that form the specific switches 10 have been inserted into these bores 17A. Each end of the bores 17A is closed off with a stopper 18 that is made of the same material as that of the foam block 17. Connector cables 19 run from the switches 10, i.e., from the switch strips, to the outside. It is possible to lay the connector cables 19 inside each of the foam blocks 17, simply by making cuts in the foam block 17 and placing the connector cables 19 in the appropriate cut.

Additional channels or cuts are made in the foam block 17, to hold the trigger mechanism 11, these trigger mechanisms being the elements that trip the switch 10. Movement of the impact surface 9 is transmitted to the trigger mechanism 11, which makes contact with the switch 10. With the two embodiments shown in FIGS. 4 and 5, the trigger mechanism 11 is not formed as an integral piece with the specific impact surface 9 or the switch 10 or the foam block 17. Rather, the trigger mechanism 11 is constructed as a separate strip or bar of rigid material, for example, a hard plastic rod, and is placed in a recess formed in the plastic block 17.

In the embodiment shown in FIG. 4, only a single switch strip is provided as the switch 10. The cross-section of this safety-switch device 7 presents, grossly simplified, a trapeze or a triangle, whereby the switch 10 is placed in the area of the cross-section where the distance to the assembly plate 16 is greatest.

In contrast to that, the embodiment shown in FIG. 5 has two switch strips 10 and the cross-section of this embodiment approximates a rectangle, whereby the two switch strips 10 are placed in the two corners that the greatest distance from the assembly plate 16. The two switch strips 10 function electrically together, so that they together form a switch 10. For this reason, in this embodiment, just two connector cables 19 are used, because the desired switch function is triggered when either one of the two switch strips 10 is actuated, and also when both switch strips 10 are actuated simultaneously.

The impact surfaces 9 in the embodiments shown in FIGS. 4 and 5 are constructed as rigid elements and, accordingly, may be made of a hard plastic. Given the relatively simple geometry, a plastic plate or sheet of material may be used to make the impact surfaces 9 in FIGS. 4 and 5, the plastic being formed to the desired shape under the influence of heat. When the shape of the impact surface 9 is geometrically more complex than the two embodiments shown, the desired shape of the impact surface 9 may be generated by means of a 3-D process. In this way, the impact surfaces 9 may be individually adapted to the particular desired shape, without requiring the use of special shaping tools that are very expensive.

It is understood that the embodiments described herein are merely illustrative of the present invention. Variations in the safety-switch device according to the invention may be contemplated by one skilled in the art without limiting the intended scope of the invention herein disclosed and as defined by the following claims.

What is claimed is:

1. A safety-switch device for use on a movable device, the safety-switch device comprising:
   a switch;
   an enclosure surrounding the switch, the enclosure including an impact surface which serves as an actuator for the switch and a bracket that is a flexible deformable body that is mountable on a surface of a housing of the movable device, the impact surface being a separate component that is replaceably assembled on the bracket;

wherein the impact surface is constructed as a rigid element and is flexibly suspended in the bracket, so as to be movable in a horizontal, vertical, and diagonal direction between a first resting position and a second actuation position that triggers a switch operation of the switch; and wherein a trigger mechanism is placed between the impact surface and the switch and triggers the switch when the impact surface moves to its actuation position.

2. The safety-switch device of claim 1, wherein the flexible deformable body is made of a foam material.

3. The safety-switch device of claim 1, wherein the bracket is constructed as a flexible strip on which the impact surface is held, the impact surface suspended freely downward.

4. The safety-switch device of claim 3, wherein the flexible strip is constructed as a profile strip made of an elastomeric material.

5. The safety-switch device of claim 4, wherein the profile strip is constructed as a hollow profile that has a hollow chamber in cross-section.

6. The safety-switch device of claim 1, wherein the bracket has a groove that receives the impact surface.

7. The safety-switch device of claim 6, wherein the impact surface and the groove have corresponding profiles, such that the impact surface is held with a positive form-fit in the groove.

8. The safety-switch device of claim 1, wherein the lower edge of the impact surface is curved toward the movable device.

9. The safety-switch device of claim 1, wherein the impact surface has an inner side that faces the device, and wherein one or more protrusions forming the trigger mechanism are provided on this inner side.

10. The safety-switch device of claim 1, wherein the trigger mechanism is a separate element arranged between the impact surface and the switch.

11. The safety-switch device of claim 1, wherein the switch is constructed as a switch strip or a switch mat.

* * * * *